Figure 1:
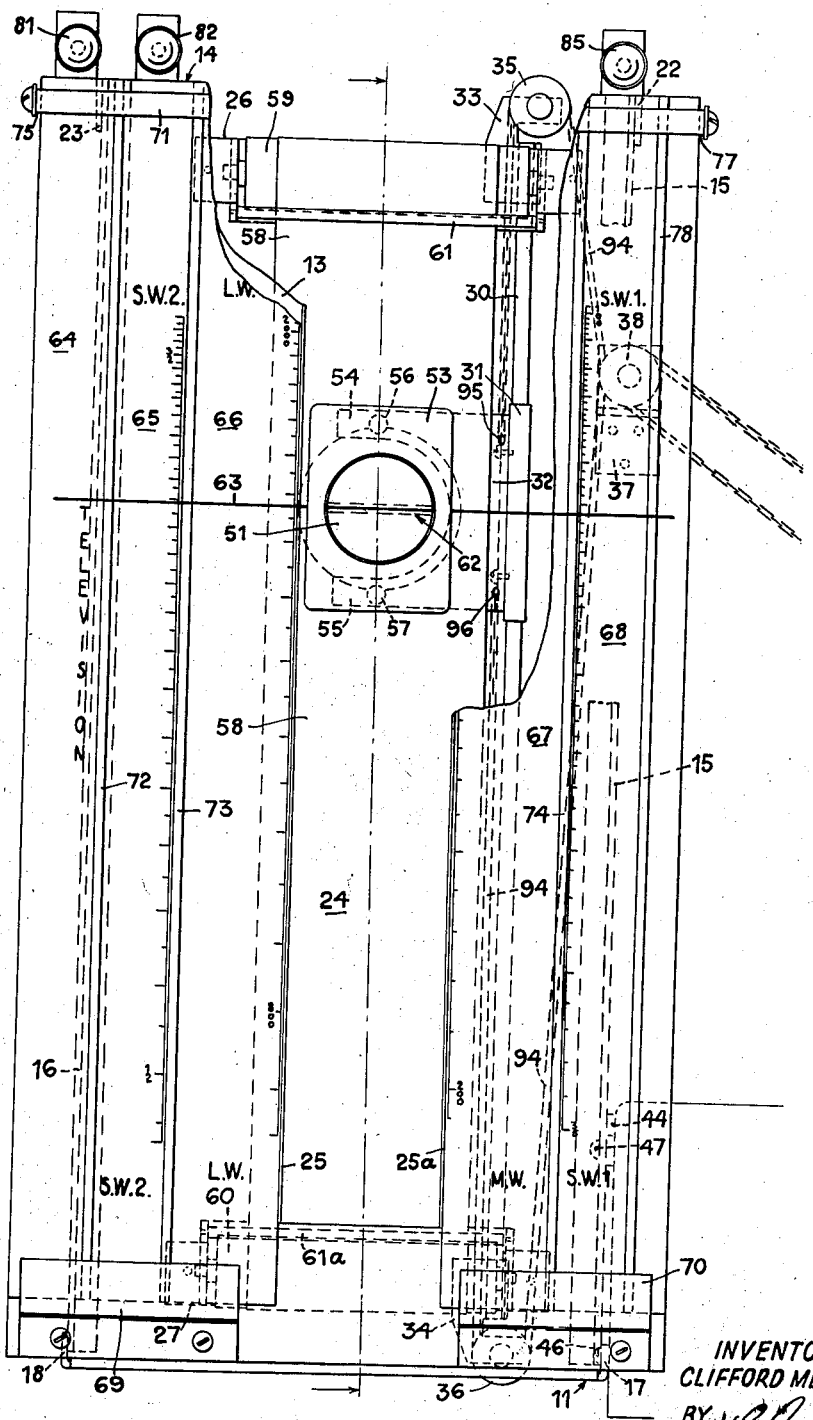

March 19, 1940.   C. METCALFE   2,194,169
RADIO AND LIKE RECEIVING APPARATUS
Filed April 28, 1938   4 Sheets-Sheet 1

INVENTOR
CLIFFORD METCALFE
BY
ATTORNEY

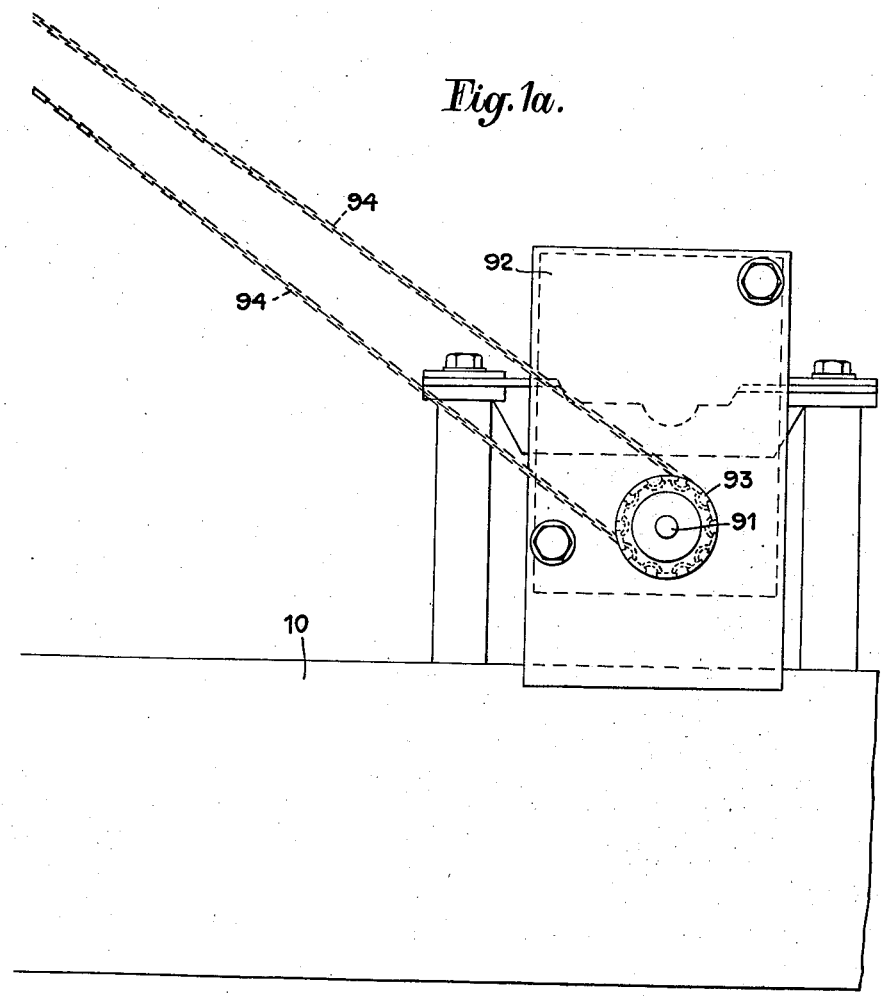

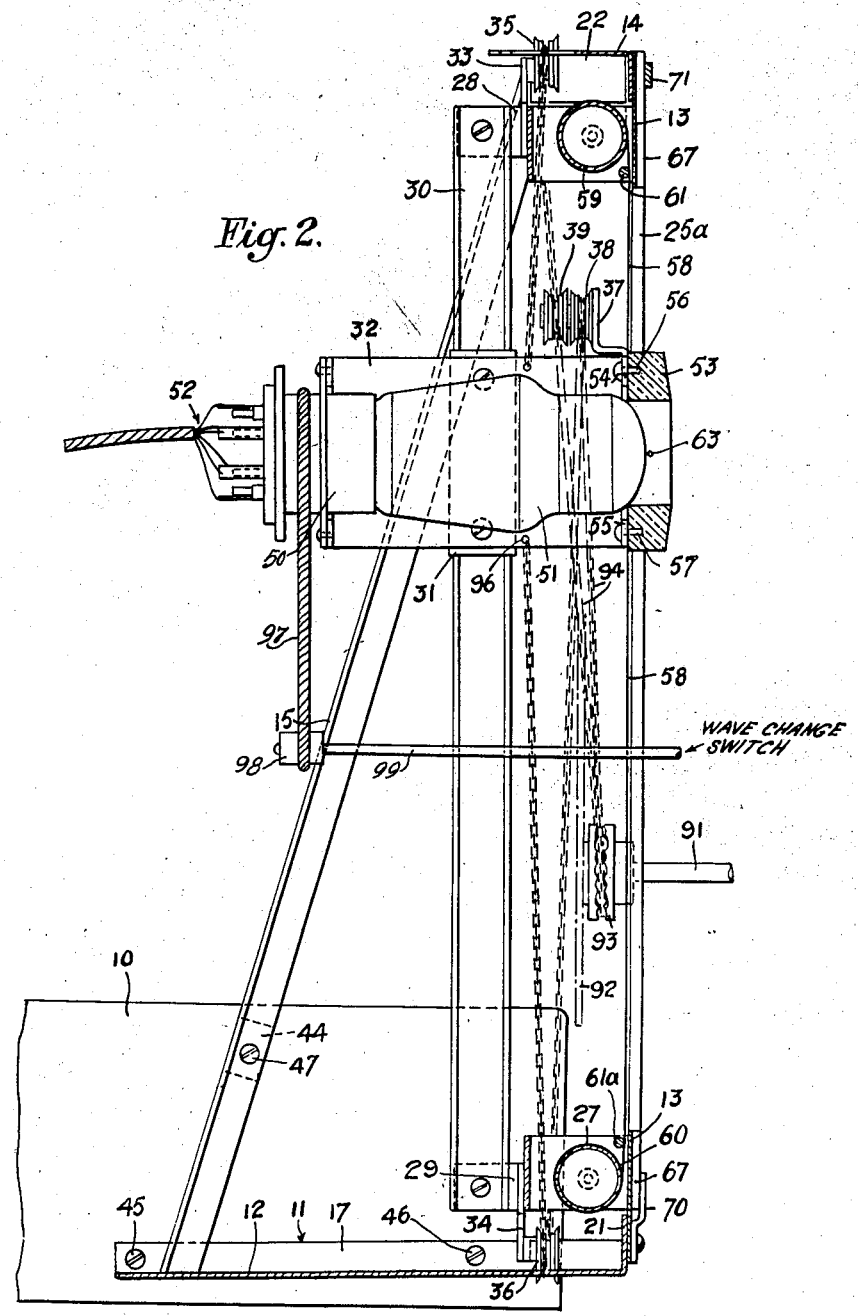

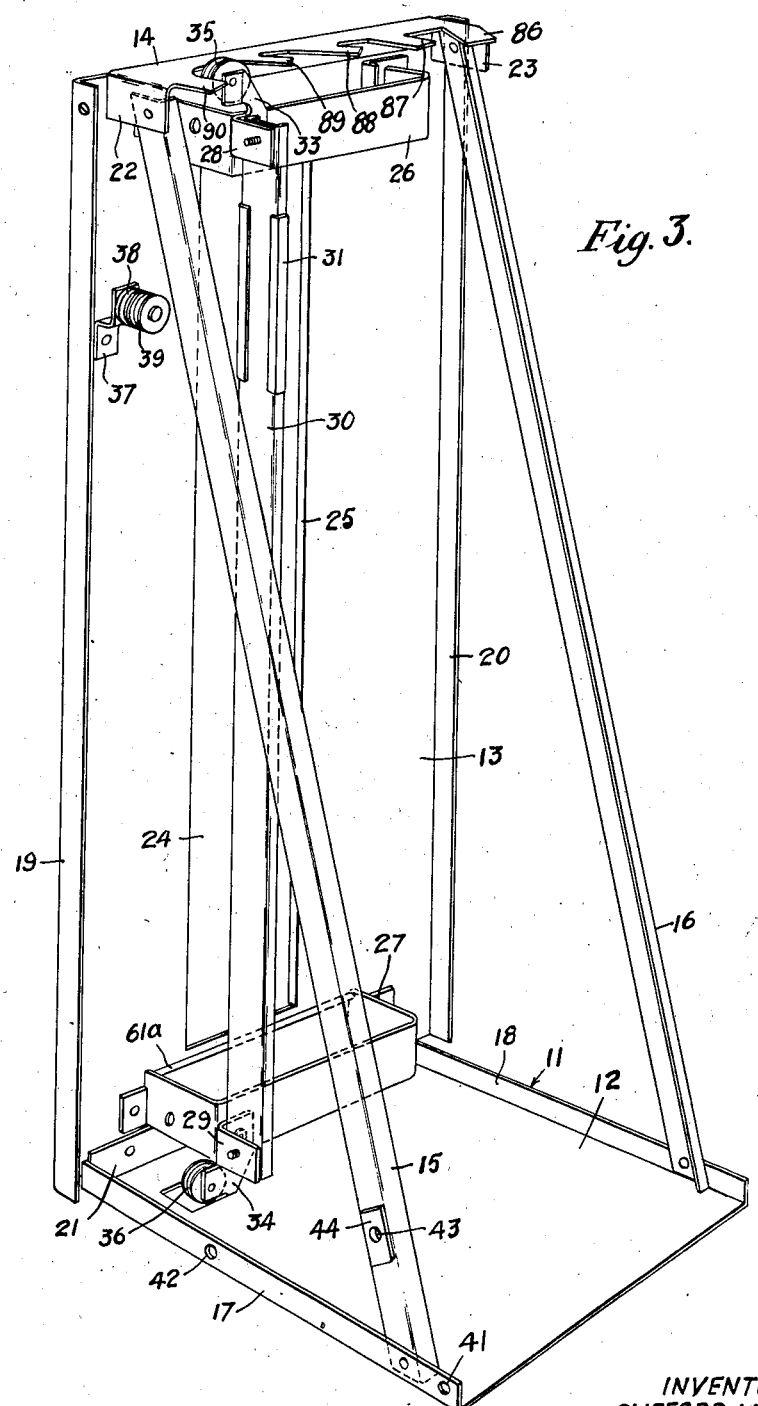

Patented Mar. 19, 1940

2,194,169

UNITED STATES PATENT OFFICE 2,194,169

RADIO AND LIKE RECEIVING APPARATUS

Clifford Metcalfe, Ruislip, England, assignor to Electric & Musical Industries Limited, Hayes, Middlesex, England, a company of Great Britain Application April 28, 1938, Serial No. 204,720
In Great Britain May 5, 1937

4 Claims. (Cl. 250—40)

This invention relates to radio and like receiving apparatus of the kind in which a cathode ray tube visual resonance indicator is employed for the purpose of indicating when the receiver is correctly tuned for the reception of a desired station.

Heretofore such resonance indicators have been mounted in a fixed position on the receiver and usually in a position remote from the wavelength scale with which a pointer or cursor cooperates. With such an arrangement difficulties arise in tuning since the resonance indicator remains in its fixed position whilst the cursor moves over its scale. Consequently, in tuning a station it is necessary for the operator to move the cursor to the appropriate position and then redirect his attention to the resonance indicator whilst still operating the control in order to bring the receiver into correct resonance with the signals being received. The fact that the operator's attention has to be directed first to the cursor and then to the resonance indicator, tends to cause the operator to tune in stations without reference to the resonance indicator, giving rise to unsatisfactory reproduction.

It is, therefore, the chief object of the present invention to provide an improved tuning arrangement embodying a cathode ray resonance indicator with a view to overcoming this disadvantage.

According to the present invention a combined tuning and resonance indicator for a radio receiver is provided, said indicator comprising a tuning scale and cursor or pointer co-operating therewith and a cathode ray indicator mounted in proximity to said cursor and so arranged and coupled to the cursor as to move substantially in synchronism with the cursor. By such an arrangement it will be appreciated that since the resonance indicator is mounted in proximity to the pointer and moves therewith, the resonance indicator is in the direct vision of the operator, and, despite the position to which the cursor may be moved, the resonance indicator does not change its relative position thereto. Hence, tuning is facilitated and the tendency for the resonance indicator to be ignored during tuning is substantially avoided.

The resonance indicator may be carried by a suitable carriage mounted upon a track, the carriage also carrying the cursor or pointer, which is preferably arranged to lie substantially in the axis of symmetry of the luminous region of the resonance indicator. If desired, in accordance with a further feature of the invention, the cursor or pointer might be omitted and the light band of the resonance indicator viewed with reference to the scale to derive a tuning indication.

The nature of the invention and the method by which the invention may be carried into practice will be readily understood from the following description in detail, reference being made by way of example to the accompanying drawings, in which:

Fig. 1 together with Fig. 1a which is a continuation of Fig. 1 show a front elevational view of a tuning and resonance indicator according to the invention shown applied to the chassis of a radio receiver, certain parts of the indicator being shown broken away for clarity, Fig. 2 is a side elevational view particularly in section of the arrangement shown in Figs. 1 and 1a, and Fig. 3 is a detail perspective view of the frame of the indicator shown in Figs. 1 and 2.

In Figs. 1 and 2 of the drawings 10 represents the chassis of a radio receiver. Secured on one end of the chassis 10 is a braced frame 11 which as clearly shown in Fig. 3, comprises a base plate 12, a front plate 13, a bracket 14 secured on the upper end of front plate 13, and bracing members 15 and 16 secured between the bracket 14 and the rear of the base plate 12. Preferably, the base plate 12 and front plate 13 are formed of shallow channel members having up-turned edges as shown at 17, 18 19 and 20 and the front edge 21 of base plate 12 is upturned as shown, for the purpose of providing a means for securing the base plate 12 to the front plate 13. The members 15 and 16 are secured between projections or lugs 22 or 23 on the bracket 14 and the ends of edges 17 and 18 on the plate 12. The frame members are preferably united by spot welding.

The front plate 13 is apertured as shown at 24, the aperture 24 being almost as long as the front plate and the edges thereof being bent outwardly at right angles as indicated at 25 to form an abutment of small depth the purpose of which will be apparent later. Secured on the plate 13 at each end of the aperture 24 are upper and lower brackets 26 and 27 respectively, which preferably span the width of the aperture 24 and are secured by spot welding at each end to the plate 13. Brackets 26 and 27 each carry a lug 28 or 29 as the case may be to which the upper or lower end respectively of a channel sectioned rail 30 is secured, the rail 30 carrying a carriage 31 which is adapted to slide up and down on the rail and to have attached to it a bracket 32 (Fig. 1) for carrying a cathode ray resonance indicator. Lugs 28 and 29 referred to above are provided with extensions 33 and 34 carrying pulleys 35 and 36 respectively, and mounted on a lug or bracket 37 on the front plate 13 are two further pulleys 38 and 39.

Holes 41 and 42 may be provided in the edge 17 of plate 12 and hole 43 and associated spacing bush 44 may be provided in or on the web member 15 to accommodate screws or rivets 45, 46 and 47 respectively by which frame 11 is secured on the chassis 10 as clearly shown in Fig. 2. The frame 11 is preferably secured on the chassis 10 with members 12 and 13 slightly inclined to the horizontal and vertical respectively, as shown in Fig. 2, so that scales mounted on the front of plate 13 as described below, may be viewed readily by an operator.

Referring now particularly to Figs. 1 and 2 of the drawings, it will be seen that the bracket 32 supports a socket member 50 for a cathode ray indicator 51, the leads to which are indicated at 52 and the front of which completely fills an aperture in a boss 53 supported on the front of the bracket 32 on extensions 54 and 55 thereof as shown dotted in Fig. 1 and being attached thereto by screws 56 and 57 respectively. Also clamped between the boss 53 and extensions 56 and 57 of the bracket 32 is a band or curtain 58 preferably of black opaque material which is adapted to be wound on or off rollers 59 or 60 as the case may be, the said rollers being supported in brackets 26 and 27, the curtain passing over guiding spindles 61 and 61a shown in brackets 26 and 27 in Fig. 2. The band 58 completely fills the aperture 24 in plate 13 except for the area defined by the aperture in boss 53. The rollers 59 and 60 are both spring urged in such direction as to tend to wind the curtain or band 58 on to the respective roller so that the band 58 is maintained in tension between spindles 61 and 61a the friction of the arrangement being such that neither spring is effective at any time to move the indicator 51 on its bracket 32 and carriage 31 along the slide rail 30.

The resonance indicator 51 may be of the single or dual light band type as shown and described in Patent No. 2,051,189 to H. M. Wagner and is arranged so that at resonance the light band or bands appears or appear horizontal, for example, as indicated at 62 in Fig. 1 and extending through boss 53 is a cursor or pointer 63 which is arranged to co-operate with wave band scales such as 64, 65, 66, 67 and 68 shown in Fig. 1 of which in the present example three scales, namely, scales 64 to 66 are shown as arranged on one side of the aperture 24 on the plate 13 and two scales, namely, scales 67 and 68 are shown as arranged on the other side of the aperture 24. In the present example scale 64 is an auxiliary scale which is illuminated when the receiver is tuned to the television wavelength, scale 65 is graduated in respect of a short wave band, scale 66 is graduated in respect of the long wave band, scale 67 is graduated in respect of the medium wave band and scale 68 is graduated in respect of a further short wave band. The scales 64 to 68 are preferably formed of thick strips of glass or other transparent or translucent material and are supported in brackets 69 and 70 (see Fig. 1) attached to the bottom of front plate 13 and maintained vertically by guide 71 secured to the upper end of front plate 13, each scale being separated from the adjacent scale by opaque filler members 72, 73 or 74 as the case may be, the scales 64 to 66 being clipped by the in-turned end 75 of guide 71 against the outwardly turned edge 25 of aperture 24 in plate 13 and scales 67 and 68 being retained in position by the in-turned end 77 of member 71 against the edge 25a formed on the plate 13 on the right-hand side of aperture 24 as shown in Fig. 1. The inner face of member 71 may be lined with resilient or yielding material such as a felt strip so that when the scales 64 to 68 are slid therethrough they will be gripped in position. The exposed edges of scales 64 and 68 may also be covered by suitable members similar to the filler members 72, 73 and 74 for example, as shown at 78 in Fig. 1. Carried on the bracket 14 are lamps such as 81, 82 and 85 by which the scales 64 to 68 are edge-lighted in known manner. These lamps are preferably mounted in clips on the projections 86 to 90 formed on the bracket 14 as shown in Fig. 3. These lamps 81 to 85 are arranged to be selectively energised in accordance with the position of a wave change switch in the receiver so that only the appropriate scale is illuminated at any given time, thus due to the fact that the scales are separated by opaque fillers only a single scale will receive any substantial illumination at any given time, this scale corresponding to the setting of the wave change switch.

The carriage 31 and bracket 32 with the indicator 51 is traversed along the slide rail 30 in accordance with the actuation of a tuning knob which is either mounted on or geared to the spindle 91 of tuning condenser of the receiver which is mounted in the frame 92 (see Fig. 1a), the mechanical movement being transmitted from the spindle 91 through a pinion 93 mounted on the spindle and a chain 94 which passes from one side of pinion 93 over pulley 39 and pulley 35 and is secured to one side of bracket 32 as shown at 95 in Fig. 2 and from the other side of pinion 93 over pulley 38 and pulley 36 and is secured to the other side of bracket 32 as shown at 96 in Fig. 2. (If desired, of course, the pulleys 35 to 38 may be replaced by pinion wheels which mesh with the chain 94.) Thus, upon actuation of the tuning knob to move spindle 91 the bracket 32 and carriage 31 will be moved to or fro as the case may be along the slide rail 30 carrying with them the cathode ray indicator 51 and the cursor 63, thus indicating the tuning condition of the receiver with reference to the appropriate scale 64 to 68. Since the resonance indicator 51 moves with the cursor 63 an operator will never be under the necessity of removing his eyes from the resonance indicator in order to observe the cursor or vice-versa and consequently the operator may readily tune a set to a particular station both with reference to the appropriate scale 64 to 68 and by reference to the indicator 51.

As mentioned above, the cathode ray indicator 31 may be a single or dual light band indicator and preferably in order to facilitate working with scales on either side an indicator of the latter type will be used.

However, alternatively, in cases where a single band indicator is used, the indicator may be arranged to be turned through 180° when changing from operation from a scale located on one side of the aperture 24 to a scale located on the other side of the aperture 24. Such an arrangement will be particularly suitable in the case where a receiver had only two ranges one scale being arranged on each side of the aperture 24. In this case, the socket 50 of the resonance indicator 51 might be carried in a suitable bearing and turned therein through the agency of the belt 97 and pulley 98 actuated by the shaft 99 of wave change mechanism (not shown) associated therewith. However, in general it is preferred to use a dual light band resonance indicator rather than a reversible single light band indicator as the added mechanical arrangements necessary have not proved to be very satisfactory in operation.

It will also be appreciated that the cursor or pointer such as 63 shown in Figs. 1 and 2, might be omitted, and the line or lines of light appearing in the resonance indicator when the receiver is turned to resonance used instead of the pointer or cursor to derive an indication with reference to the operative tuning scale.

Furthermore, while a vertical arrangement of scales 64 to 68 has been shown, other arrangements such as a horizontal arrangement or an arcuate arrangement may be used.

I claim:

1. In a radio receiver, a combined tuning and resonance indicator comprising in combination a plurality of spaced rectilinear tuning scales defining a track, a carrier movable along said track in response to adjustment of the receiver tuning means, a cursor or pointer mounted on the carrier and adapted to co-operate with each tuning scale, and a cathode ray resonance indicator mounted on said carrier and in proximity to said cursor and so arranged as to move in synchronism with or substantially in synchronism with the movement of the cursor, in such manner that despite movement of the cursor or pointer, the cursor or pointer and the resonance indicator remain together in the direct vision of the operator, said scales being arranged at least one on either side of the track in which the resonance indicator moves.

2. In a radio receiver, a combined tuning and resonance indicator as set forth in claim 1 in which the resonance indicator is of the dual light band type.

3. In a radio receiver, a combined tuning and resonance indicator as set forth in claim 1 in which the resonance indicator is of the single light band type and means operated by the wave band switch on said receiver to turn said indicator about its axis to direct the light band towards a particular scale with which the pointer is co-operating.

4. In a radio receiver, a combined tuning and resonance indicator comprising in combination a plurality of spaced rectilinear scale bearing members defining a track, a carrier movable along said track in response to adjustment of the receiver tuning means, opaque members carried by the carrier and arranged to cover the track area except for that portion occupied by the carrier, means adapted to be actuated to illuminate selectively said scale bearing members in accordance with the setting of a range changing device in the receiver, a cursor or pointer mounted on the carrier and adapted to co-operate with each tuning scale, and a cathode ray resonance indicator mounted on said carrier and in proximity to said cursor and so arranged as to move in synchronism with or substantially in synchronism with the movement of the cursor, in such manner that despite movement of the cursor or pointer, the cursor or pointer and the resonance indicator remain together in the direct vision of the operator, said scale bearing members being arranged at least one on either side of the track in which the resonance indicator moves.

CLIFFORD METCALFE.